United States Patent
Werner

[15] 3,650,513
[45] Mar. 21, 1972

[54] AERATION DEVICE

[72] Inventor: Frank D. Werner, 5405 Mt. Normandale Curve, Minneapolis, Minn. 55431

[22] Filed: Apr. 4, 1969

[21] Appl. No.: 813,466

[52] U.S. Cl. ...................................................261/87
[51] Int. Cl. ...........................................B01f 7/26
[58] Field of Search ........................261/87, 93, 122

[56] References Cited

UNITED STATES PATENTS

| 1,124,855 | 1/1915 | Callow et al. | 261/87 |
| 1,285,494 | 11/1918 | Wallace et al. | 261/122 |
| 1,374,446 | 4/1921 | Greenawalt | 261/87 |
| 2,121,458 | 6/1938 | Vogelbusch | 261/87 X |
| 2,944,802 | 7/1960 | Daman | 261/93 X |
| 2,996,287 | 8/1961 | Audran | 261/87 X |
| 3,256,802 | 6/1966 | Karr | 261/122 |
| 3,464,552 | 9/1969 | Warman | 261/87 X |
| 3,490,996 | 1/1970 | Kelly, Jr | 261/87 |

*Primary Examiner*—Tim R. Miles
*Assistant Examiner*—Steven H. Markowitz
*Attorney*—Dugger, Peterson, Johnson & Westman

[57] ABSTRACT

An aeration device comprising a rotating disc having porous surfaces through which a fluid can be passed to be dispersed into a liquid in which the disc is rotating.

14 Claims, 8 Drawing Figures

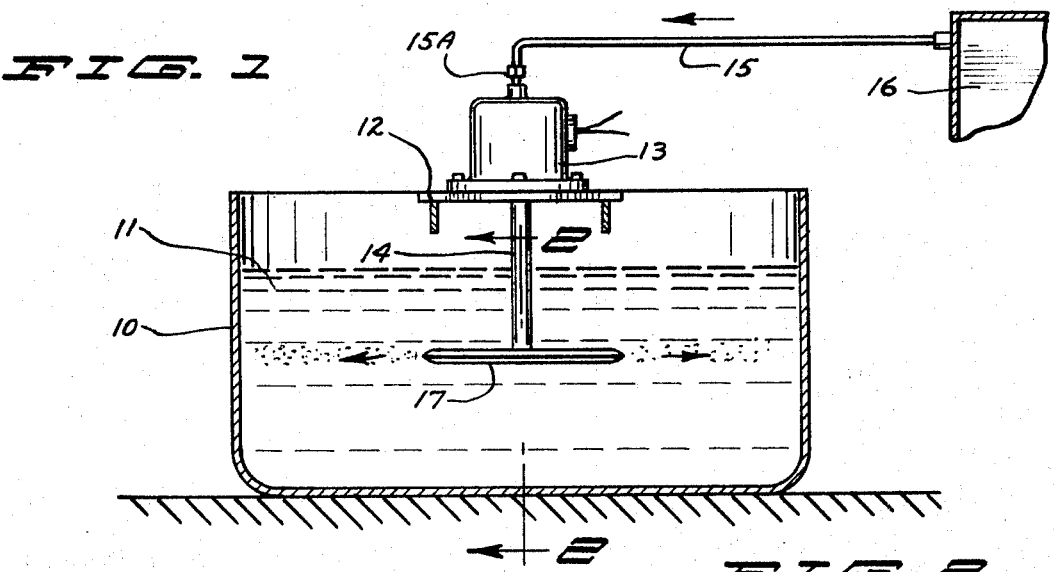
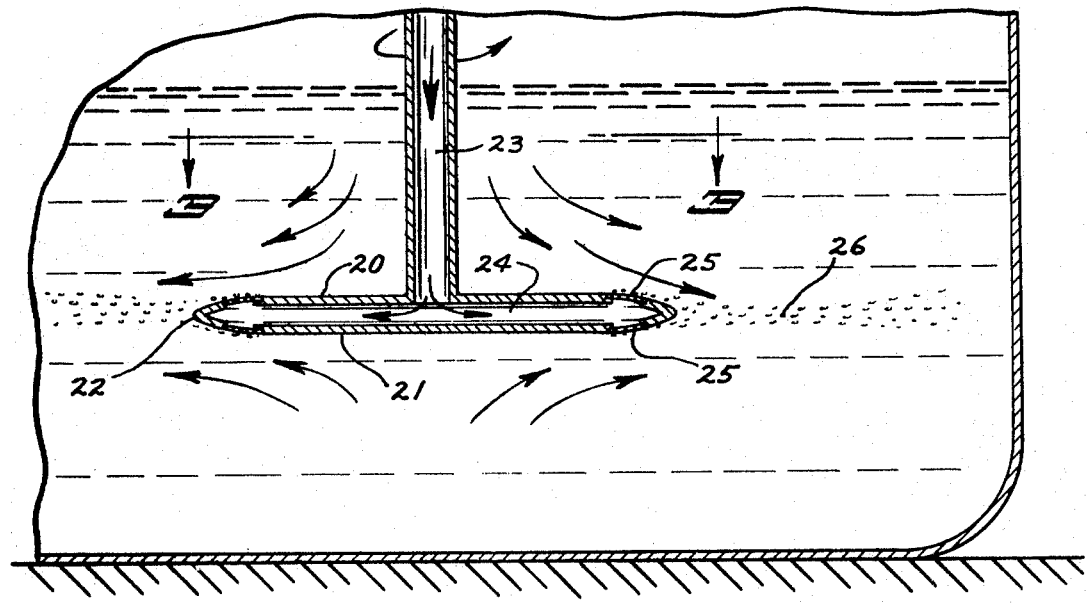
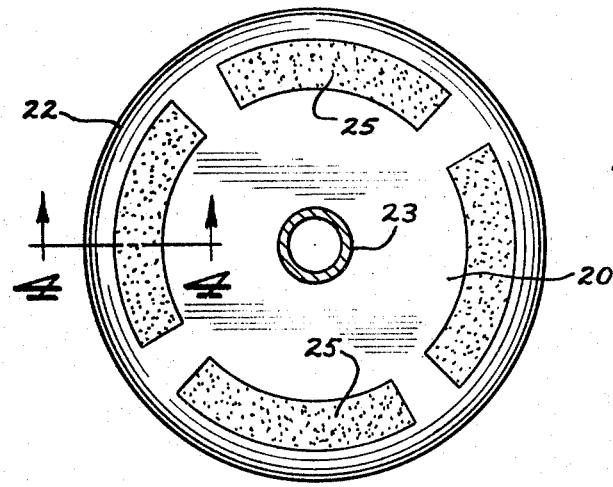
INVENTOR.
FRANK D. WERNER

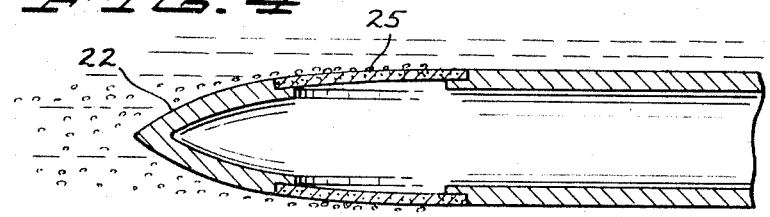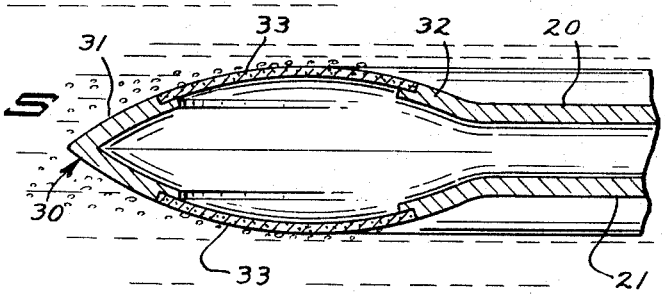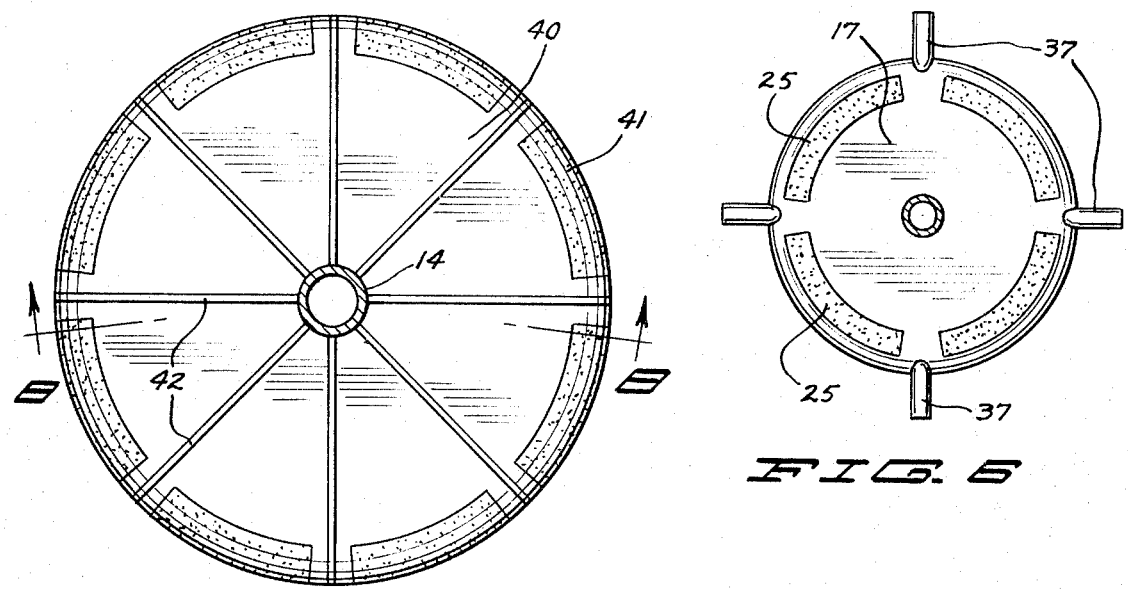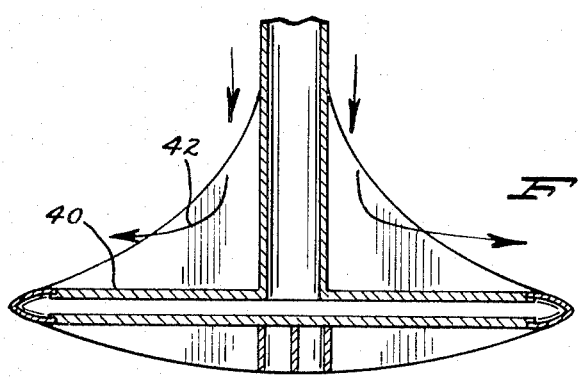
INVENTOR.
FRANK D. WERNER
BY
Dugger, Peterson, Johnson & Westman
ATTORNEYS

AERATION DEVICE

BACKGROUND OF THE INVENTION

1. Field of the Invention

The present invention relates to devices for dispersing a fluid into a liquid.

2. Prior art

Various aeration devices have been advanced wherein a gas can be dispersed into a liquid with a rotating element. Rotating discs have been shown in U.S. Pat. No. 1,242,445, U.S. Pat. No. 1,374,446, U.S. Pat. No. 2,996,487 and others. These patents all show large orifices in the discs for the gas. Some have substantially the entire peripheral edge portion of the disc open. In addition to the rotating disc types of aerators there are many that use a rotating propeller or vane which causes a good deal of turbulence. The turbulence of course results in increased horsepower requirements and the desired effect of having minute bubbles dispersed into the liquid is not efficiently achieved.

SUMMARY OF THE INVENTION

The present invention has relation to a rotating disc like element for mixing a fluid into a liquid in which the disc is rotating. The disc is made so that it does not cause any excessive turbulence or disturbance to the liquid as it rotates. The disc has porous surfaces with minute openings through which a fluid (gaseous or a liquid) is released as the disc rotates. These porous surfaces are made up of a sintered metal or similar material having minute pores or openings.

The use of a vibration causing device which helps to displace the small bubbles from the rotating disc is also disclosed. The invention also comprises introducing humid or nearly saturated air or gas into the liquid to prevent evaporation of water right at the porous surface. Evaporation of the liquid particularly water, can cause carbonates or other solutes to collect on the porous surface thereby plugging up the orifices through which the gaseous fluid is dispersed into the liquid.

Utilizing a disc means that physical displacement of the water is minimized as the disc rotates, and the fluid is swept off the porous surfaces in minute bubbles and is carried outwardly without turbulence caused by liquid displacement.

BRIEF DESCRIPTION OF THE DRAWINGS

FIG. 1 is a schematic side elevational view of a device made according to the present invention installed within a tank in which aeration of a liquid is to take place;

FIG. 2 is a sectional view taken as on line 2—2 in FIG. 1;

FIG. 3 is a sectional view taken as on line 3—3 in FIG. 2;

FIG. 4 is a sectional view taken as on line 4—4 in FIG. 3;

FIG. 5 is a sectional view taken on substantially the same line as FIG. 4 showing an optional configuration for the outer ends of the rotating disc;

FIG. 6 is a top plan view of the device of FIG. 4 showing vibrating rods installed to cause vibration of the disc as it rotates;

FIG. 7 is a top plan view of a further modified form of the present invention; and FIG. 8 is a sectional view taken as on line 8—8 in FIG. 7.

DESCRIPTION OF THE PREFERRED EMBODIMENT

Referring to the drawings, FIG. 1 shows schematically a tank in which a liquid, such as water 11 is contained, and which is to be aerated. The term aeration as used herein means that a liquid is to have a gaseous fluid dispersed therein. Normally this is an introduction of air which is necessary for aeration of sewage or the like. The term is to include the dispersion of any fluid within another fluid or liquid by the structure of the devices disclosed.

The tank 10 supports a platform or frame 12 on which a drive motor 13 is mounted. The motor can be powered to rotate a hollow shaft 14. As shown, the hollow shaft 14 extends through the motor, and the shaft is open to a conduit 15 leading from a source 16 of suitable fluid which can be under pressure or not depending on the requirements. A fluid carrying rotating joint coupling 15A connects the conduit 15 to shaft 14. The fluid can be air, oxygen, or any other fluid, preferably gaseous, that is to be dispersed into the liquid 11.

The shaft 14 has a hollow disc-like assembly 17 at its lower end, which, as shown, comprises two dished members 20 and 21 joined together at an outer edge portion 22 which is tapered and comes out to a relatively sharp peripheral edge. The disclike member is therefore generally lenticular (double convex) in shape. As shown, the disc-like member itself is hollow between the planar members 20 and 21, and the fluid or gas coming from the source 16 through the conduit 15 is fed through the interior passageway of the shaft 14 and into the interior chamber 24 of the disc.

Adjacent the peripheral edges of the disc, but not out at the edge portions 22, there are sections of the members 20 and 21 which are made up of a material having minute pores therethrough. These sections are shown at 25 in FIGS. 2, 3 and 4 in this form of the invention. These sections of material can be completely annular if desired, or can be made up into segments as shown. The material is made to have a multitude of very fine pores, desirably ranging from about 5 to 50 microns in mean transverse dimension, such as sintered metal, ceramic or finely porous plastic which will permit small bubbles of the gaseous material coming from chamber 24 to pass through the walls or portions 25 and form on the outer surfaces of the disc. The porous material is of substantially uniform density throughout the wall thickness. Thus when the disc is rotating in the liquid 11, the disc can achieve a high velocity, and the small bubbles forming on the surfaces 25 will be swept off by the liquid moving past the surfaces. The centrifugal flow of the boundary layer of water moving radially outwardly along the disc will carry these swept off bubbles outwardly into a stream of bubbles illustrated generally at 26 and these small bubbles will disperse throughout the liquid, causing oxygen to be dispersed. One of the points of interest here is that there is no excessive turbulence because the disc itself does not displace any water as it rotates. It is symmetrical about its rotating axis so that there is no turbulence created except within the boundary layer, which may be either laminar or turbulent, depending on the Reynolds's Number, in a well known way. There is a thin boundary layer of water that moves with significant speeds and this boundary layer will move outwardly causing the bubbles to be swept off and dispersed into the liquid.

In FIG. 5, the wall members 20 and 21 are terminated inwardly from the outer edge of the assembly. The outer edge portion here comprises a complete annular section 30 including an outer peripheral member 31, and annular outwardly raised convex portions 32 between the members 20 and 21 and the peripheral member 30. The enlarged portions look much like airfoils in cross section as shown in FIG. 5, and the finely porous wall portions 33 are placed in these airfoil portions. The gas coming in through the hollow disc will be dispersed out through the porous wall portions 33. Because of the radial water flow over the convex airfoil-like portions 32, and well known physical principles, the porous portions 33 may be at a much lower pressure on their outer surface than the surrounding portions. If the pressure drops enough, the device may become self pumping so that the reduction in pressure will actually cause the gas to pass through the porous material 33, forming bubbles on the outer surfaces thereof. The radial sweep of the water as it passes over the airfoil-like portions causes this self pumping action. This also aids in reducing the horse-power required for operation of the unit. In a self pumping situation there would not be any need for a sealed rotating joint such as that shown at 15A which is necessary if a conduit is used and fluid under pressure is supplied by the source 16. The rotating shaft 14 could be merely open to the atmosphere and the self pumping action could take care of the pumping of air into the liquid.

In FIG. 6, a modified form of the invention is shown. This device is the same type of disc as that shown in FIG. 3, and has the porous portion 25 on the disc 17. However, short radial rods 37 are provided at the periphery. These rods will vibrate as the disc rotates causing the bubbles forming on the surfaces of pads 25 to be vibrated off as the disc rotates thus increasing the dispersion of the bubbles into the liquid. The rods need not be circular in cross section, and the rods will respond by giving a frequency of vibration that is dependent upon their shape, length, and velocity. This effect is well known in fluid dynamics, one popularly known result being a "singing" or "galloping" electrical line when wind blows across it. In the present case, the hollow shaft acts as a torsional spring and the disc as a flywheel, undergoing torsional vibrations.

In a vibrating disc, if a small bubble is about to be washed off the porous surfaces 25, and the disc has torsional oscillation or vibration caused by the rods 37, the bubble will experience maximum velocity peaks to wash it off without any increase in average velocity. In other words, the velocity of the bubble will increase and decrease from the vibrations, but the average velocity would not change. Since the average velocity governs power consumption, this would mean that more bubbles could be shaken off with the same power being consumed. The more bubbles that are shaken off with the same power consumption means that a greater dispersion of oxygen into the liquid 11 is achieved without increasing horsepower consumption.

In FIGS. 7 and 8, there is a further modified form of the invention. Here, the disc-like member 40 is again mounted onto the hollow shaft 14. There are peripheral porous pad members 41 made up of a sintered metal material or the like as in the previous forms of the invention and these are positioned right at the peripheral edge of the disc-like member 40. The porous portion could be positioned at the top and bottom surfaces as well.

In the top and bottom of the disc member 40, which again has a hollow interior, tapered vanes 42 are provided which extend radially outwardly from the shaft 14 or from the center of the disc on the bottom part. These vanes thus cause a flow of water radially outwardly as the unit rotates. The disc gives greater turbulence, but also gives larger water flow as well. This causes a pumping and physical displacement of the water so that the bubbles at the porous surfaces of the disc will be swept off both by the radially outward pumping caused by the vanes 42 and also by the sweeping by of the water as the disc rotates. These vanes or blades need not be of the refined shape described. Simple, non-tapered ribs will serve to increase the radial pumping, if their simpler shapes are preferred. If desired, they need not extend all the way inward to the shaft, nor outward to the periphery.

Again, getting many many small bubbles into the water is the prime objective and this is accomplished with the radial pumping action.

The sintered metal can be of any desired porosity. The pores are extremely small, desirably in the range of 5 to 50 microns, so that bubbles in the range of 5 to 10 microns in diameter are collected on the surface of the porous material and are swept off by the water as it flows outwardly. The small bubbles have a large proportionate surface area for the volume of gas being dispersed into the liquid and this greatly aids in the absorption of the gas in the liquid.

In all forms of the invention, the source of fluid 16 can be made to supply a humid air or gaseous fluid so that it is preferably fully saturated with water vapor as it passes through the hollow shaft 14 and out through the pores of the porous pads 25, 33 or 41. The fully saturated air thus insures that as it enters the liquid there will be no evaporation of the water right at the orifices. This evaporation of water at the orifices of aeration devices causes a build up of carbonates and other foreign material that will precipitate out when the water evaporates. The precipitates cause a clogging of the pores in the material through which the gas passes. When extra fine pores are used, such as those in the present invention, this becomes more of a problem. By using a fully saturated fluid from the source of fluid 16 (fully saturated with water vapor), this clogging up of the pores due to the collection of carbonates and other foreign materials caused by evaporation of the water in which the gas is being dispersed on the porous pads is greatly reduced, and is substantially eliminated.

The rotating members as shown are of uniform radial cross section around the axis of rotation to make sure there is no water displacement and resulting turbulence from the discs themselves as they rotate.

The present device is also useful for dispersing drops or globules of a first liquid into another liquid with which the first liquid is immiscible. The source of fluid 16 would be a source of the first liquid and the second liquid would be in container 10. The sintered metal sections on the rotating disc would provide small droplets of the first liquid on the surface of the disc which would be swept off and dispersed in the second liquid just like the bubbles described.

I claim:

1. In a device for dispersing a fluid into a liquid, a disc like member, means to mount said disc like member for rotation about an axis in said liquid, said disc like member having first and second spaced walls extending outwardly from the axis of rotation, and having a substantially identical cross sectional shape annularly about said axis of rotation, said walls being spaced apart on the main portion of said member and tapering together to form a narrow edge portion at the periphery of said disc like member, said spaced walls forming an unobstructed interior chamber which narrows adjacent its peripheral edges, a source of fluid, a conduit open from said source of fluid to said chamber, and means on said disc like member comprising a porous wall portion spaced from the peripheral edge having openings through which said fluid may pass from the interior of said disc like member to said liquid.

2. The device of claim 1 wherein said wall portion comprises at least portions of the exposed surface of said disclike member, and comprises a sintered metal material.

3. The device of claim 1 wherein said porous wall portion is only on the upper and lower surfaces of said disclike member, the outer peripheral portion of said disclike member being of a non porous material.

4. The device of claim 3 wherein said porous wall portion is positioned between the axis of rotation of the disclike member and the outer peripheral portions, and has at least one surface that is substantially airfoil shaped in radial cross section to cause a reduction of pressure at the surface of said disclike member from liquid moving outwardly from the axis of rotation of said disclike member as the liquid passes over said porous wall portion.

5. The device of claim 1 and a plurality of substantially radially extending vanes on the outside of said disclike member.

6. The device of claim 1 wherein said disclike member has porous wall portions at both the top and bottom thereof.

7. The combination as specified in claim 6 wherein the wall portions on both the top and bottom walls of said disc have convex radial cross sections between the axis of rotation and the outer peripheral portions of the disclike member.

8. The device of claim 1 wherein said source of fluid comprises a source of gas that is substantially saturated with vapor of the same composition and at the same temperature as the liquid into which the gas is introduced through said disclike member.

9. The device of claim 1 and a plurality of radially extending rod members spaced apart around the peripheral edge of said rotating disc and fixedly attached to said rotating disc.

10. In a device for dispersing a fluid into a liquid, a generally lenticularly shaped member, means to mount said member for rotation about an axis centrally located on said member and extending at substantially right angles to the general plane of the member in said liquid, said member defining an unobstructed interior chamber, a source of fluid, a conduit open from a source of fluid to said interior chamber, and means forming a part of said member comprising a wall portion having openings open to the outer surface of the member spaced from the peripheral edge of said member and in communication with the interior chamber so that fluid may pass through the openings in said wall portion from the interior chamber of said member to said liquid.

11. The device of claim 10 wherein said wall portion comprises finely porous material having pores varying between 5 and 50 microns in mean transverse dimension.

12. The device of claim 1 wherein said porous wall portion is positioned between the axis of rotation of said member and the outer peripheral portions, and said porous wall portion has at least one surface that is convex in radial cross section between the axis of rotation and the periphery to cause a reduction of pressure at the outer surface of said member from liquid moving outwardly from the axis of rotation of said member as it passes over said porous wall portion.

13. The device of claim 1 wherein said fluid comprises a second liquid that is immiscible in the first mentioned liquid.

14. The device of claim 1 and means for inducing torsional vibration of said disc like member about its axis as said disc like member rotates.

* * * * *